US008214419B2

(12) United States Patent
Metzgen

(10) Patent No.: US 8,214,419 B2
(45) Date of Patent: *Jul. 3, 2012

(54) METHODS AND APPARATUS FOR IMPLEMENTING A SATURATING MULTIPLIER

(75) Inventor: Paul Metzgen, Chiswick (GB)

(73) Assignee: Altera Corporation, San Jose, CA (US)

( * ) Notice: Subject to any disclaimer, the term of this patent is extended or adjusted under 35 U.S.C. 154(b) by 784 days.

This patent is subject to a terminal disclaimer.

(21) Appl. No.: 12/346,692

(22) Filed: Dec. 30, 2008

(65) Prior Publication Data

US 2009/0172067 A1 Jul. 2, 2009

Related U.S. Application Data

(63) Continuation of application No. 10/918,117, filed on Aug. 12, 2004, now Pat. No. 7,487,196.

(60) Provisional application No. 60/530,445, filed on Dec. 16, 2003.

(51) Int. Cl.
*G06F 7/38* (2006.01)
*G06F 7/52* (2006.01)

(52) U.S. Cl. ...................................... 708/551; 708/620

(58) Field of Classification Search .......... 708/620–632, 708/550–553
See application file for complete search history.

(56) References Cited

U.S. PATENT DOCUMENTS 6,209,017 B1 * 3/2001 Lim et al. .................... 708/552
2005/0027773 A1 * 2/2005 Machnicki et al. ........... 708/523

* cited by examiner

*Primary Examiner* — Tan V. Mai
(74) *Attorney, Agent, or Firm* — Kwan & Olynick LLP

(57) ABSTRACT

Methods and apparatus are provided for implementing an efficient saturating multiplier associated with addition and subtraction logic. The result of the multiplier is saturated before accumulating. The result of the multiplier can be stored in a result register in unsaturated form. The output of the result register can then be saturated and provided to addition and subtraction logic to allow efficient implementation of a saturating multiplier.

20 Claims, 18 Drawing Sheets

| M[16] | M[15] | Add/Sub | Q |
|---|---|---|---|
| 0 | 0 | +/− | Q[15:0] = Z[15:0] +/− M[15:0] |
| 0 | 1 | +/− | Q[15:0] = Z[15:0] +/− ~M[15:0] |
| 1 | 0 | +/− | Not possible |
| 1 | 1 | +/− | Q[15:0] = Z[15:0] +/− M[15:0] |

| | M[16] | M[15] | Add/Sub | Q | Invert-M | Carry-In |
|---|---|---|---|---|---|---|
| 1001 | 0 | 0 | + | $Q[15:0] = Z[15:0] + M[15:0]$ | 0 | 0 |
| 1003 | 0 | 0 | - | $Q[15:0] = Z[15:0] + \sim M[15:0] + 1$ | 1 | 1 |
| 1005 | 0 | 1 | + | $Q[15:0] = Z[15:0] + \sim M[15:0]$ | 1 | 0 |
| 1007 | 0 | 1 | - | $Q[15:0] = Z[15:0] + M[15:0] + 1$ | 0 | 1 |
| 1009 | 1 | 0 | + / - | Not possible | - | - |
| 1011 | 1 | 1 | + | $Q[15:0] = Z[15:0] + M[15:0]$ | 0 | 0 |
| 1013 | 1 | 1 | - | $Q[15:0] = Z[15:0] + \sim M[15:0] + 1$ | 1 | 1 |

Figure 10

METHODS AND APPARATUS FOR IMPLEMENTING A SATURATING MULTIPLIER

CROSS REFERENCE TO RELATED APPLICATIONS

This application is a continuation of and claims benefit of priority under 35 U.S.C. 120 of U.S. patent application Ser. No. 10/918,117 filed on Aug. 12, 2004 now U.S. Pat. No. 7,487,196, which claims benefit of priority under 35 U.S.C. 119(e) of U.S. Provisional Application No. 60/530,445 filed Dec. 16, 2003 and titled "METHODS AND APPARATUS FOR IMPLEMENTING A SATURATING MULTIPLIER", the entireties of both applications are incorporated by reference for all purposes.

BACKGROUND OF THE INVENTION

1. Field of the Invention

The present invention relates to a saturating multiplier. In one example, the present invention relates to methods and apparatus for using the saturating multiplier to implement a multiply-accumulate (MAC) unit.

2. Description of Related Art

Hardware devices such as programmable logic chips use multipliers and associated logic to perform various operations. In typical instances, multipliers handle data having a fixed width. For example, a multiplier may be a multiplier on a 32-bit processor. In this case, the multiplier is configured to perform an operation on two 32-bit operands. In some case, the product of the two 32-bit operands can be represented as a 32-bit product. However, in other instances, a 32-bit data width may not be able to represent the 32-bit product. For example, multiplication of two 32-bit numbers may yield a 64-bit product. Because the datapath of a processor may not support the 64-bit product, saturation is provided as a solution.

When saturation occurs, the 64-bit product is simply represented as the closest value presentable by a 32-bit data sequence. The saturated value can then be added to or subtracted from other values. The adding or subtracting may involve other conditions such as carry overflow.

However, mechanisms for implementing multipliers and handling saturation associated with a multiplier are limited. In some instances, the saturation condition is explicitly detected. However, explicitly detecting saturation conditions can be inefficient, particularly on programmable devices. Consequently, techniques and mechanisms are provided for more efficiently handling saturation associated with a multiplier and multiply accumulate blocks.

SUMMARY OF THE INVENTION

Methods and apparatus are provided for implementing an efficient saturating multiplier associated with addition and subtraction logic. The result of the multiplier is saturated before accumulating. The result of the multiplier can be stored in a result register in unsaturated form. The output of the result register can then be saturated and provided to addition and subtraction logic to allow efficient implementation of a saturating multiplier.

In one embodiment, a method for performing multiplication on a programmable chip is provided. A multiply operation is performed using a multiplier associated with addition/subtraction (add/sub) logic. The result of the multiplier is saturated before accumulating by using add/sub logic. Saturating the result of the multiplier before accumulating allows implementation of multiply accumulate using a reduced number of logic elements.

In another embodiment, a programmable chip is provided. The programmable chip includes a signed multiplier, an extractor, an adder, and a saturation block. The signed multiplier is configured to receive a first input A and a second input B. The signed multiplier is configured to provide an output C. The extractor is configured to take the output C and truncate the output to provide a truncated value M. The adder is configured to take truncated value M as a first input and provide a value D. The saturation block is operable to saturate the value D to provide a value Z as the second input to the adder.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

FIG. 10 is a diagrammatic representation showing multiply accumulate conditions.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular processors and memory.

For example, the techniques of the present invention will be described in the context of particular components and devices. However, it should be noted that the techniques of the present invention can be applied to a variety of types of components and devices. In the following description, numerous specific details are set forth in order to provide a thorough understanding of the present invention. The present invention may be practiced without some or all of these specific details. In other instances, well known process operations have not been described in detail in order not to unnecessarily obscure the present invention. Furthermore, techniques and mechanisms of the present invention will sometimes be described in singular form for clarity. However, it should noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

A variety of devices including Digital Signal Processing (DSP) processors make extensive use of multiplication and addition/subtraction. In many instances, it is not possible to represent the result of a multiplication (or addition) in the number of bits allowed, so many standards including DSP standards specify that the result be saturated to the largest or smallest number representable.

Figure 1:
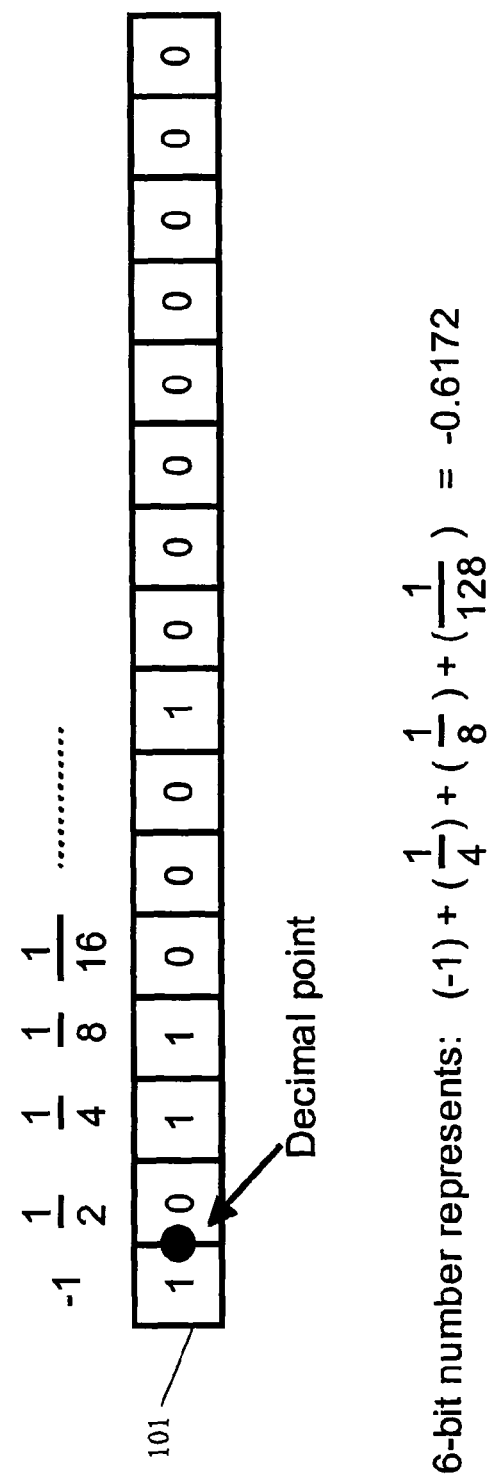
FIG. 1 is a diagrammatic representation showing 1q15 encoding.

In one example, the 1q15 format is used to represent floating point numbers. That is, the 1q15 representation is used for representing numbers in the range: −1 to +0.999. FIG. 1 is a diagrammatic representation showing a 1q15 representation. Value 101 includes a single bit preceding a decimal point 103. Value 101 is also referred to as M. The bit preceding the decimal point, the leftmost bit in this case, is referred to herein as M[15]. The bits after the decimal point 103 are referred to herein as M[14 . . . 0] with M[0] being the right most bit. The locations M[15 . . . 0] are provided values −1, ½, ¼, ⅛, ¹⁄₁₆, . . . , ¹⁄₃₂,₇₆₈. Consequently, value 101 has a bit sequence 101100010000000 which is mapped to −1+¼+⅛+¹⁄₁₂₈=−0.6172. The highest value in 1q15 of 0.999 is represented as 0111111111111111 while the lowest value of −1 is represented as 1000000000000000.

Figure 2:
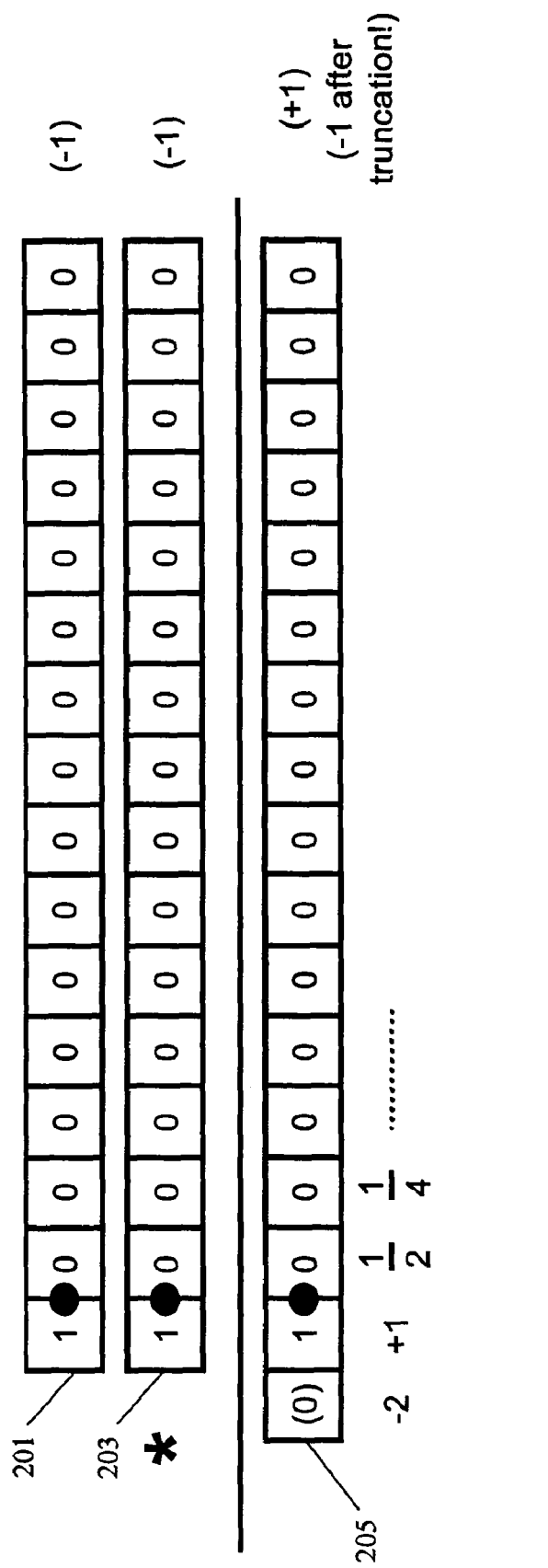
FIG. 2 is a diagrammatic representation showing multiplication of 1q15 encoded values.

Performing operations on fixed bit-length numbers can yield results that can not be represented in the same bit-length. For example, multiplying two 1q15 numbers gives a 2q30 result. However, this result is often truncated back to a 1q15 format, resulting in a loss of precision (from truncating the 30 bits after the decimal point to 15 bits). In most cases, the truncation leads to an accurate result. However, multiplying (−1)*(−1) results in an incorrect result after truncation: (giving (−1) instead of (+1)). In this case, the result is saturated instead. FIG. 2 is a diagrammatic representation showing an inaccurate result. The value 201 or −1 is multiplied by the value 203 or −1. The result should yield a +1 value. However, +1 can not be represented in 1q15 format. Truncation at 205 yields the same −1 value. Consequently, the result should be saturated. By using saturation, the closest value to the +1 value is used to represent the result. Consequently, the result is represented as 0111111111111111 or 0.999.

According to various embodiments, multiplication is often associated with an addition or subtraction. In some examples, a multiply-accumulate unit provided is capable of the following operations:

performing a multiplication, storing the result (MUL);
performing a multiplication, adding the result to the previously stored value (MAC);
performing a multiplication, subtracting the result to the previously stored value (MSC).

Figure 3:
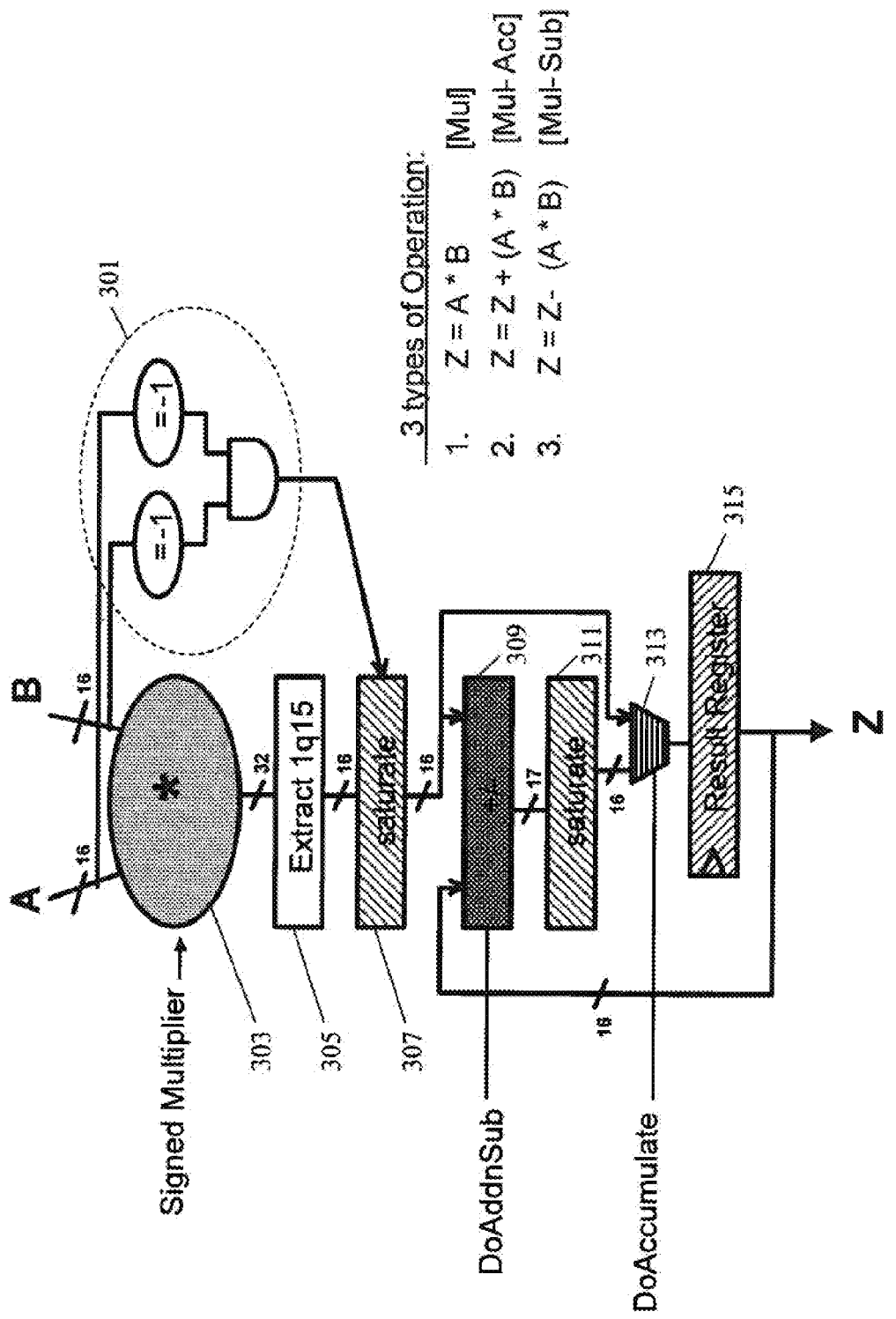
FIG. 3 is a diagrammatic representation showing a multiply accumulate (MAC) block.

In many implementations, saturation of the multiplication result occurs before any further addition/subtraction. FIG. 3 is a diagrammatic representation showing a datapath for one example of a multiply-accumulate (MAC) unit. Circuitry 301 is used to explicitly detect if saturation will occur. A signed multiplier 303 performs a multiplication of two values. The value is truncated to 1q15 format at 305. Although the techniques and mechanisms of the present invention are described in the context of 1q15 format multiplication, it should be appreciated that the techniques and mechanisms can be applied to any type of saturating multiplication. The value is saturated at 307 if saturation is detected at 301. Optional addition and subtraction is performed at 309 and saturated at 311. Accumulation is performed at 313 and the result is stored in a register at 315.

Figure 4:
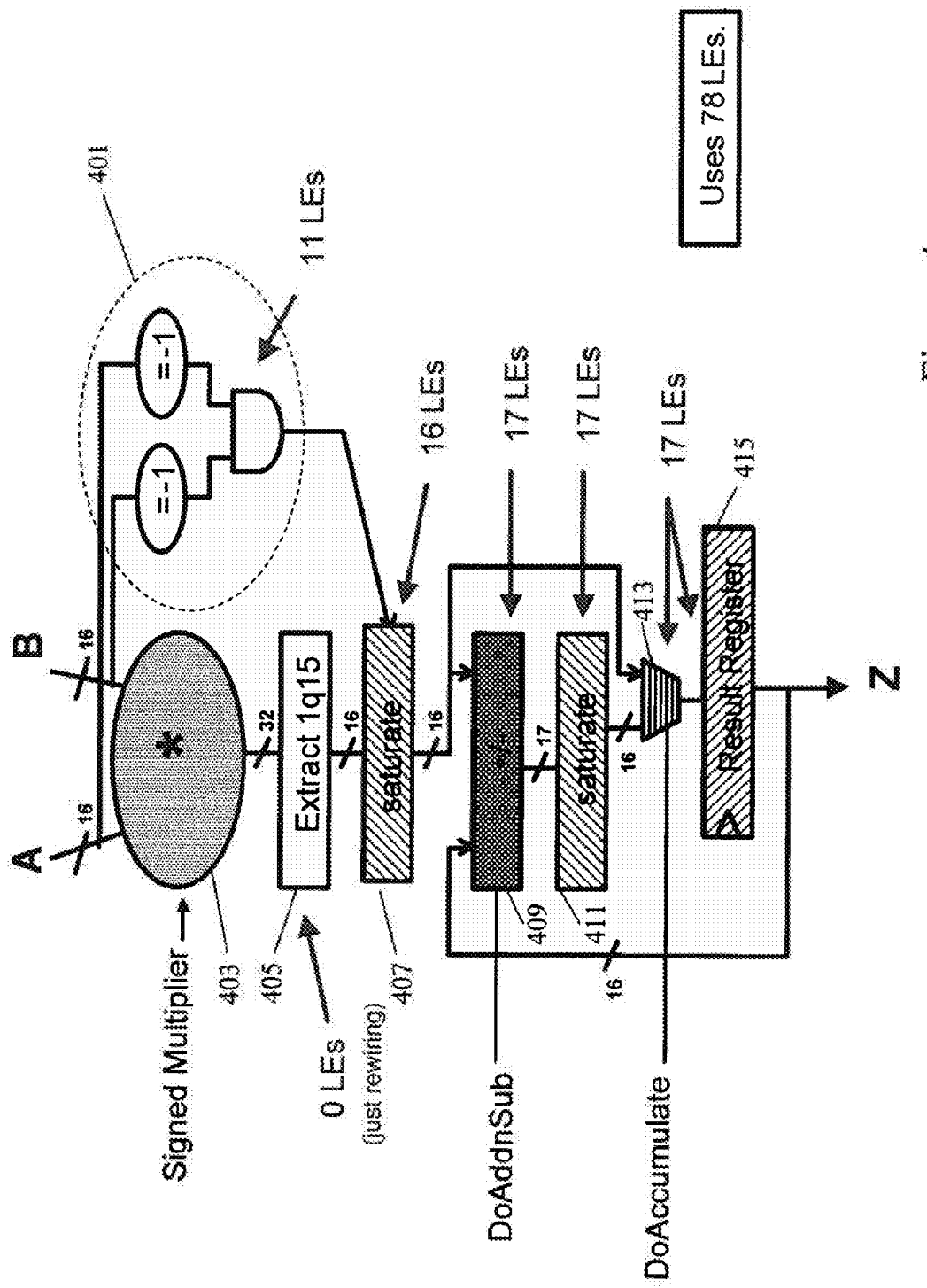
FIG. 4 is a diagrammatic representation showing a multiply accumulate (MAC) block and explicit saturation detection.

FIG. 4 is a diagrammatic representation showing a datapath for one example of a typical MAC unit. A relatively large number of logic elements (LEs) are required to identify and track saturation on a programmable chip. Circuitry 401 is used to explicitly detect if saturation will occur and is implemented using 11 LEs. A signed multiplier 403 performs a multiplication of two values. The value is truncated to 1q15 format at 405. The value is saturated at 407 using 16 LEs if saturation is detected at 401. Optional addition and subtraction is performed at 409 using 17 LEs and saturation is performed at 411 using 17 LEs. Accumulation is performed at 413 using 17 LEs and the result is stored in a register at 415 using 17 LEs.

Figure 5:
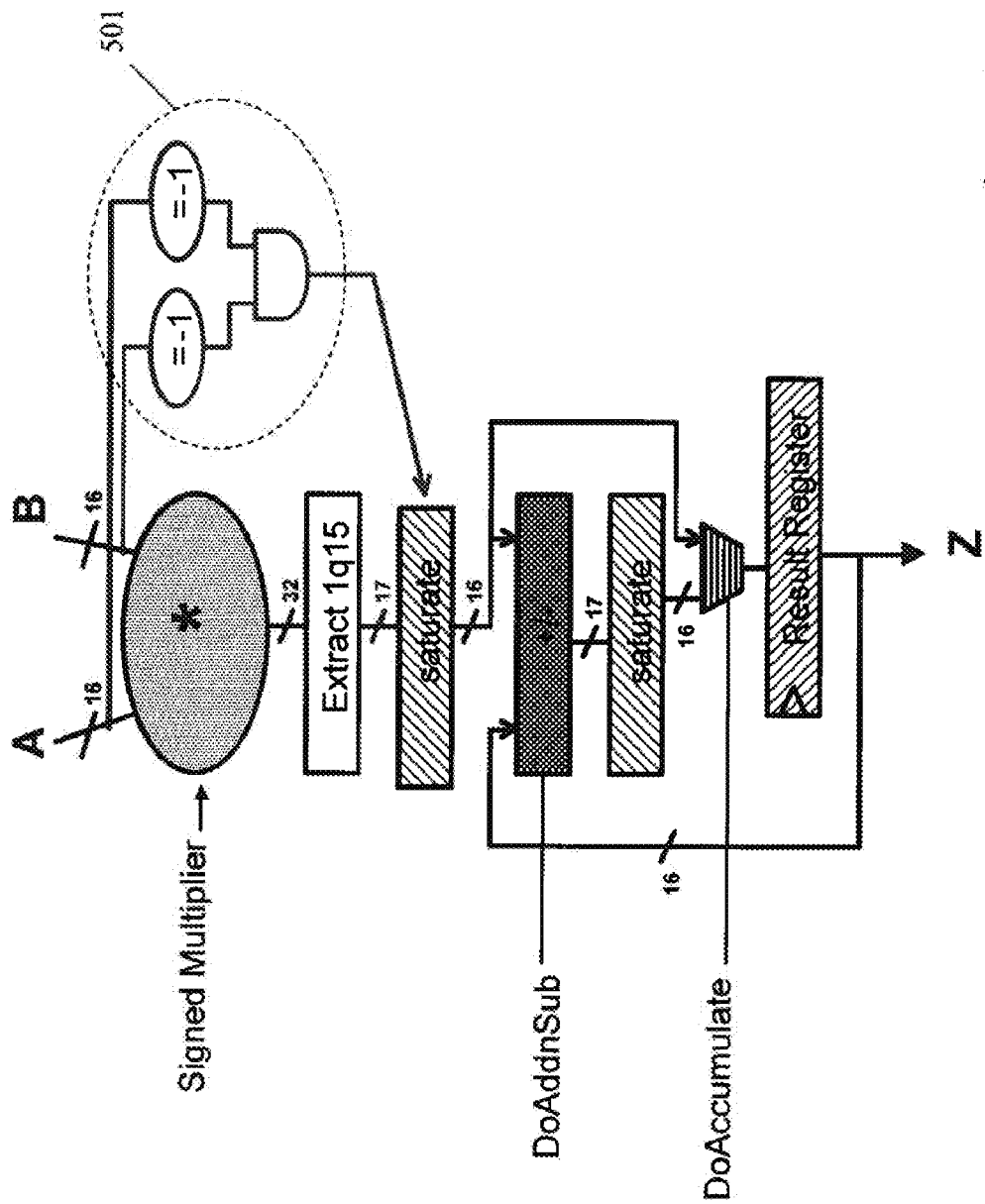
FIG. 5 is a diagrammatic representation showing a multiply accumulate (MAC) block and explicit saturation detection.

FIG. 5 is a diagrammatic representation showing an example of a portion of a MAC unit that can be removed. Instead of detecting the (−1)*(−1) case explicitly, overflow in the multiplier result is checked. Consequently, circuitry 501 can be removed. Overflow occurs when the sign bit of the multiplier is not equal to the sign bit of the multiplier result truncated to 1q15.

Figure 6:
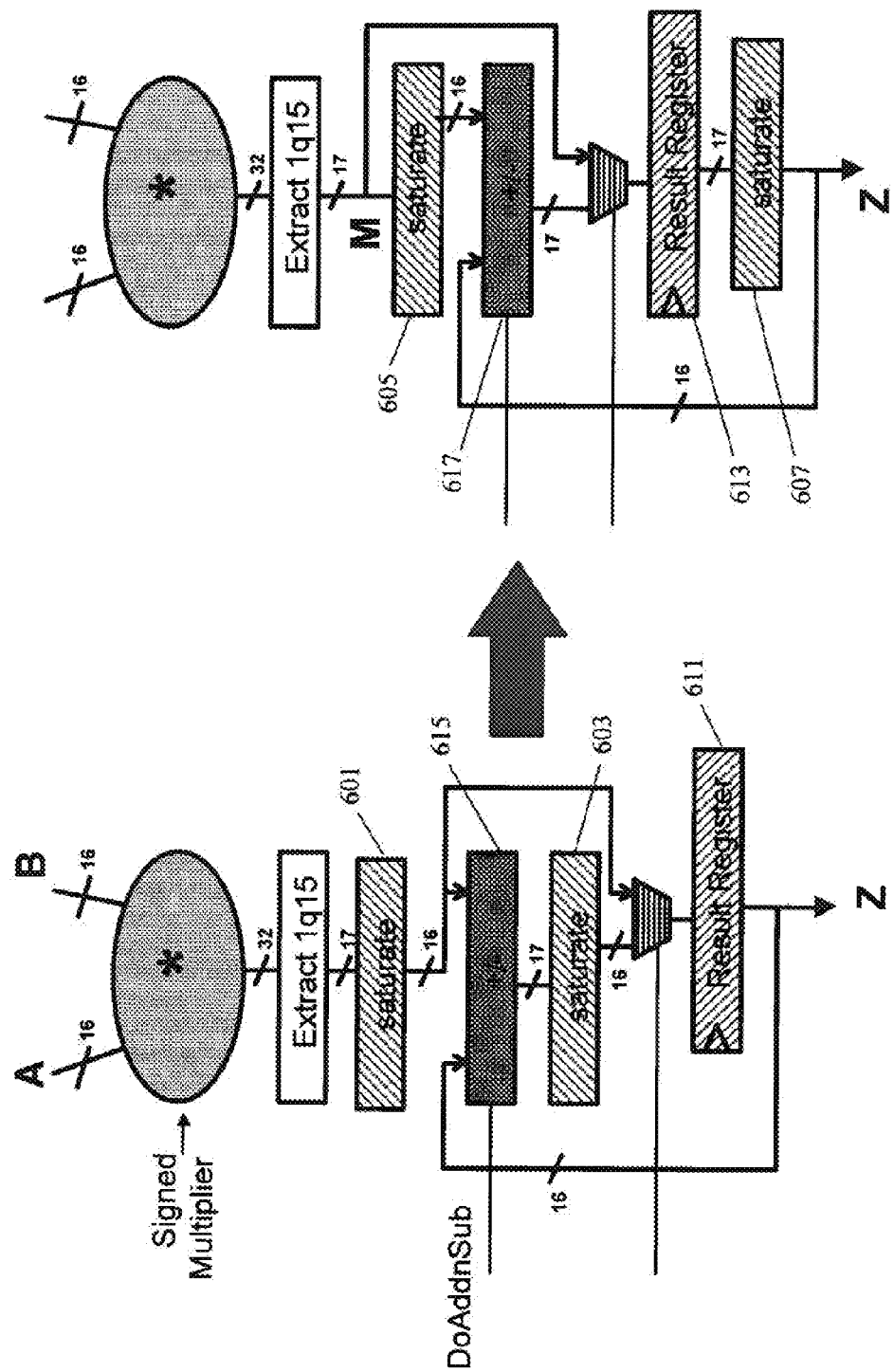
FIG. 6 is a diagrammatic representation showing a multiply accumulate (MAC) block with explicit saturation detection removed.

FIG. 6 is a diagrammatic representation showing another alternative arrangement for a MAC unit. In a typical arrangement, saturation blocks 601 and 603 provide a saturated value to a result register 611. However, the techniques of the present invention recognize that the result register value output can be saturated instead. An unsaturated value is stored in a result register 607. Saturation is performed on the register output at 607. The left-hand input to add/sub 617 is saturated.

Figure 7:
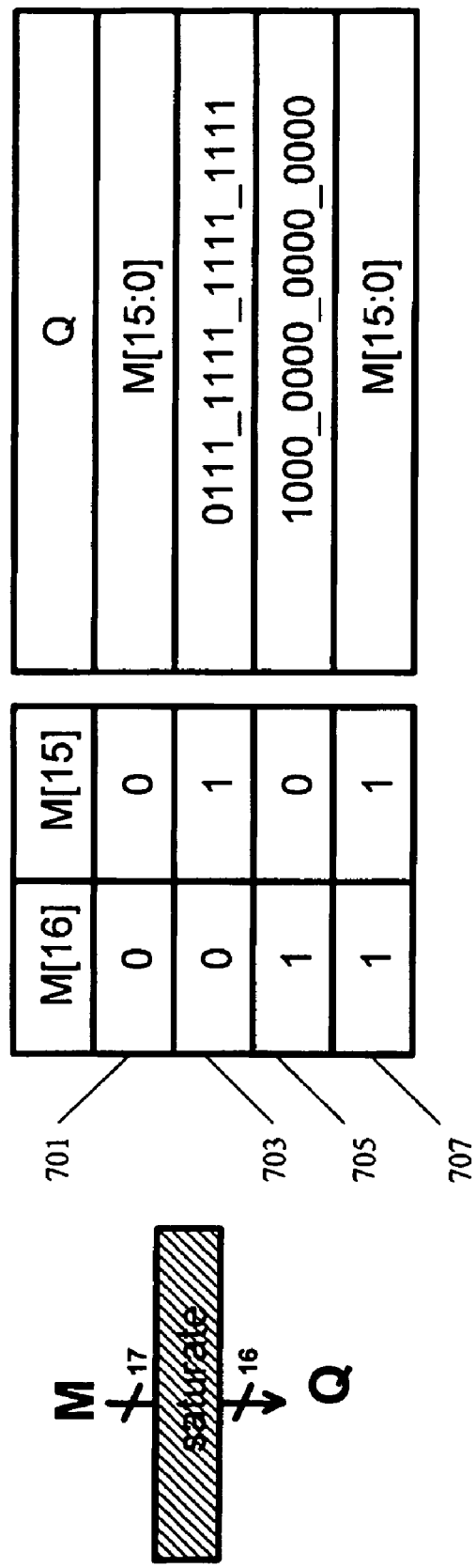
FIG. 7 is a diagrammatic representation showing saturation conditions.

FIG. 7 is a diagrammatic representation showing saturation conditions. Saturation occurs when the sign of the 17-bit number is not the same as the sign of the number when truncated to 16-bits. According to various embodiments, saturation is a function of 3-inputs, M[16], M[15], M[i]->Q [i]. Therefore, 16 4-input lookup tables can be used for implementation.

According to various embodiments, entries 701 and 707 show no saturation condition. Consequently, the output provided is the same as the M[15:0] input provided. However, entries 703 and 705 show saturation conditions. That is, M[16] is not the same as M[15]. In one example, when M[16] is 0 and M[15] is 1 at 703, the untruncated value provided should be +1 or greater. Consequently, the saturated output provided is the value closest to +1, or 0111111111111111 or +0.999. In another example, when M[16] is 1 and M[15] is 0 at 705, the untruncated value provided should be −1 or less. Consequently, the saturated output provided is the value closest to −1, or 1000000000000000 or −1.

Figure 8:
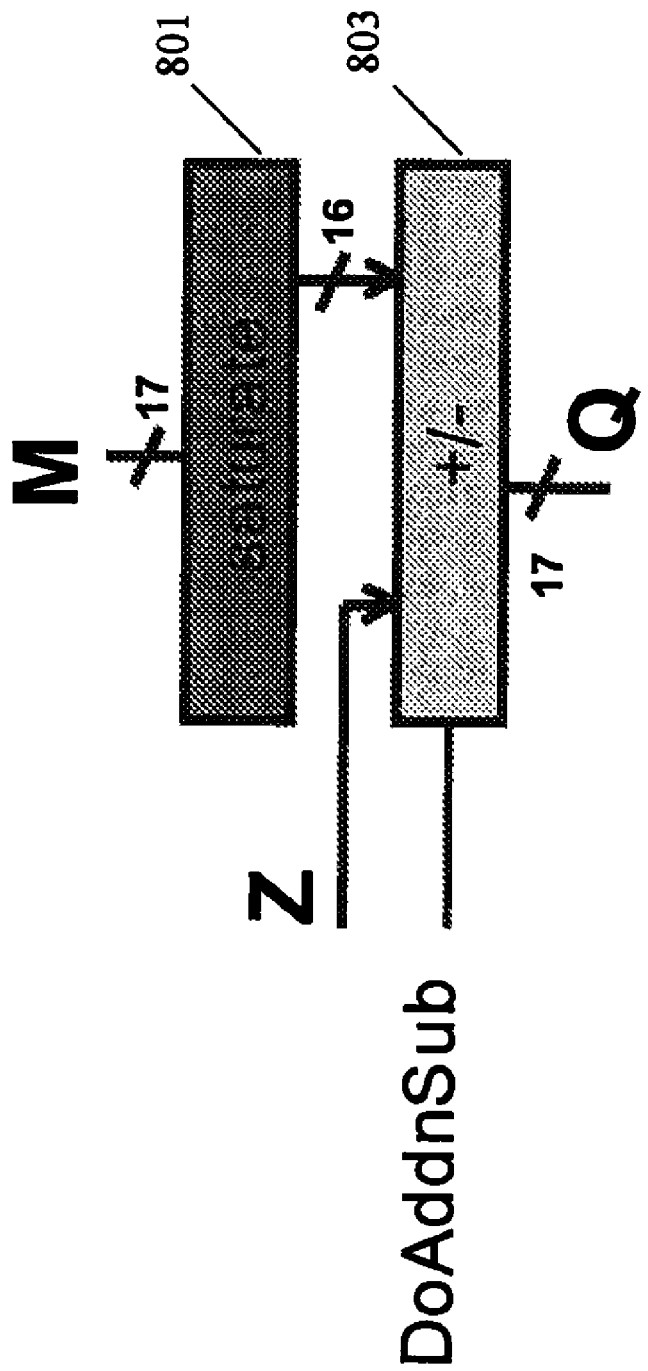
FIG. 8 is a diagrammatic representation depicting a saturation block.

FIG. 8 is a diagrammatic representation showing a typical implementation of a saturating add/sub unit. According to various embodiments, the saturation handling add/sub uses 16 LEs at 801 for handling saturation and an additional 17 LEs for handling add/sub at 803. In one embodiment, the techniques of the present invention allow implementation using 18 LEs.

Figures 9A, 9B:
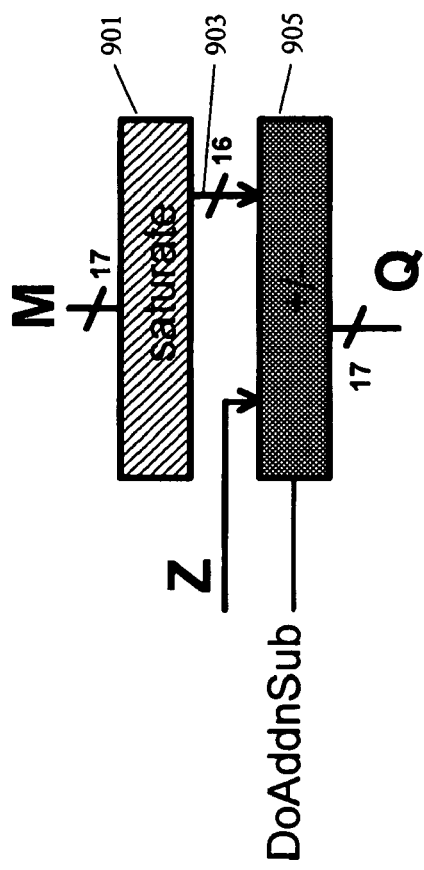
FIGS. 9A and 9B are diagrammatic representations showing saturation and accumulate conditions.

FIG. 9A is diagrammatic representations showing an implementation of a saturating add/sub unit, according to various embodiments. Saturate block 901 provides an output used as right hand operand 903 for add/sub unit 905. Z 907 is provided as the other input. According to various embodiments, Saturate (M[16:0])=M[15:0] unless M[16:0]= "0100 . . . 00" in which case "0111 . . . 111" should be used in the right hand input 903 of the add/sub 905. Note that "0111 . . . 111" is ~M[15:0] in this case (where ~ is logical not).

FIG. 9B is a table representation showing logical operations used to implement the saturating add/sub unit. Entries 911 and 917 show no saturation, and the value M[15:0] is provided as the right hand input while Z[15:0] is provided as the left hand input to the add/sub unit 905. The result is Q[15:0]. Entry 915 is not used. Entry 913 shows saturation where M[16] is 0 and M[15] is 1. Consequently, ~M[15:0] should be provided as the right hand input 903 to account for saturation.

FIG. 10 is a table representation showing one example of the operation of saturating add/sub. The techniques of the present invention recognize that ~M can be further simplified by noting that (X−Y)=(X+~Y+1). Entries 1001 and 1011 show cases where no saturation occurs and the result is provided for addition. No inversion or carry-in is needed. Entries 1003 and 1013 show no saturation where the result is provided for subtraction. In these cases, M is inverted and carry-in is provided. The inversion and carry-in represented as ~M[15:0]+1 is equivalent to having minus M[15:0]. Entry 1009 is not used. Entries 1005 and 1007 show saturation cases. For entry 1005 with saturation and addition, M is inverted but no carry-in is provided. For entry 1007 with saturation and subtraction, M is not inverted but carry-in is provided. The Invert-M 1021 and Carry-In 1023 columns indicate if M needs inversion and Q needs the addition of one. The table shows that a Saturating add/sub can be implemented using a modified adder, where:

Invert-M=~DoAddnSub XOR M[16] XOR M[15]; and
Carry-In=~DoAddnSub.

Figure 11:
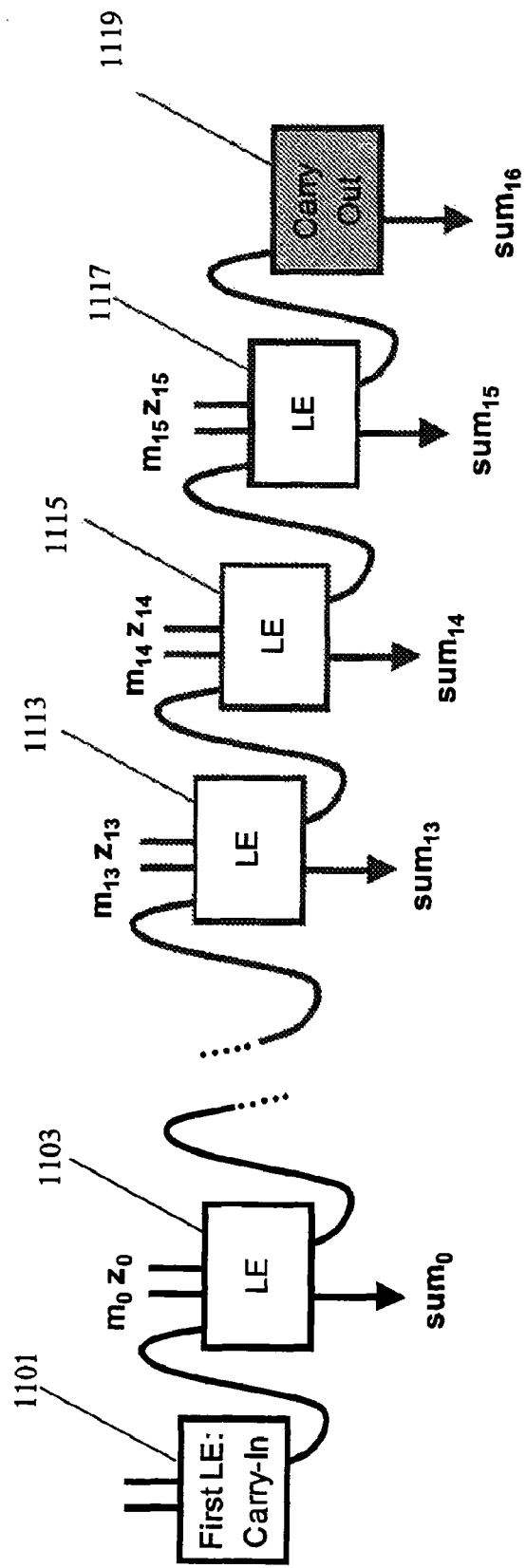
FIG. 11 is a diagrammatic representation showing a chain of logic elements.

Although, inversion and carry-in can be implemented in a wide variety of manners, the following description outlines a particularly convenient mechanism for implementing inversion and carry-in. The mechanisms and techniques of the present invention can also be implemented using a typical logic element in arithmetic mode. FIG. 11 is a diagrammatic representation showing one example of a chain of logic elements used in arithmetic mode. A chain of logic elements can be used to implement a saturating add/sub. Logic element 1101 is used provided an carry-in. LEs 1103-1117 provide a chain to allow implementation of a saturating add using one LE per bit. LE 1119 is provided for carryout due to any possible arithmetic overflow.

Figure 12:
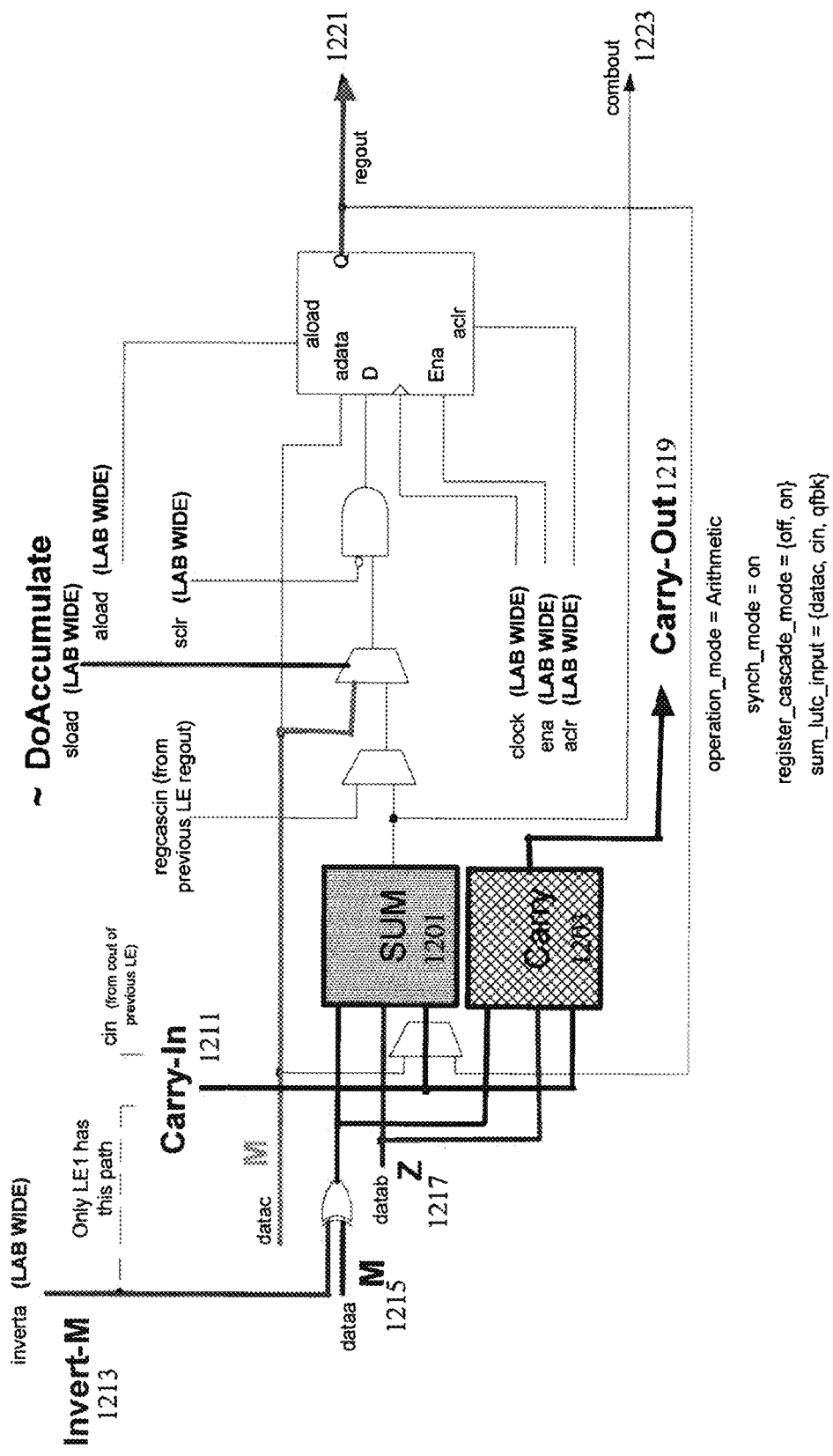
FIG. 12 is a diagrammatic representation showing a logic element.

FIG. 12 is a diagrammatic representation depicting an example of a logic element in arithmetic mode. The logic element includes a sum block 1201 and a carry block 1203. A carry-in bit is provided at 1211. An invert-M bit is provided at 1213 and an M bit is provided at 1215. The invert-M and M bit is used as a first operand for a summation. The other operand Z is provided at 1217. Any carry-out is provided at 1219. A register output is provided at 1221 and a combined output is provided at 1223.

Figure 13:
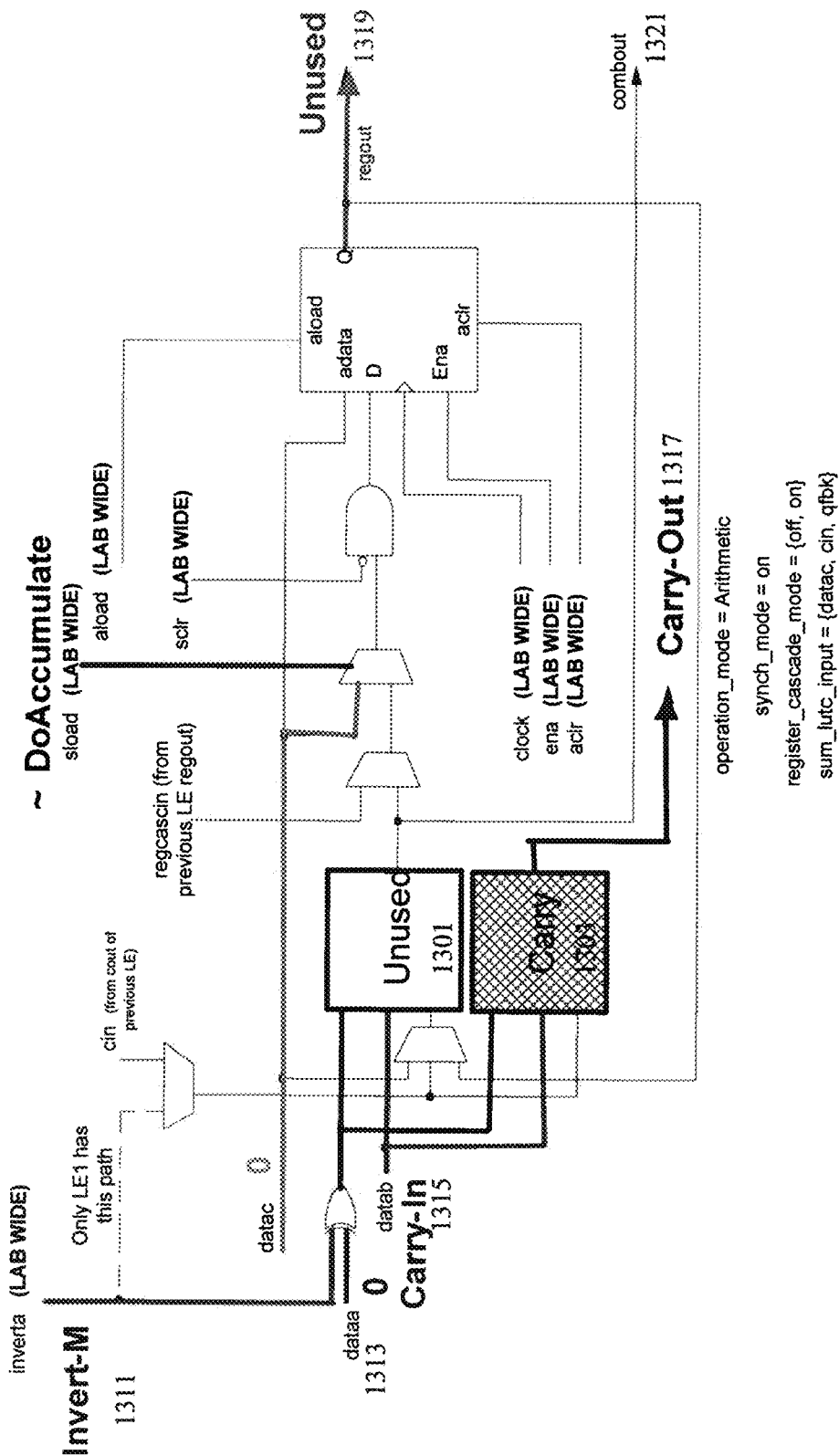
FIG. 13 is a diagrammatic representation depicting a logic element configured for an initial calculation.

FIG. 13 is a diagrammatic representation showing an example of a logic element in arithmetic mode for an initial bit used to set up the carry in. The logic element includes an unused sum block 1301 and a carry block 1303. A carry-in bit is provided at 1315. An invert-M bit is provided at 1311 and a 0 is provided at 1313. Any carry-out is provided at 1317. A register output is unused at 1319 and a combined output is provided at 1321.

Figure 14:
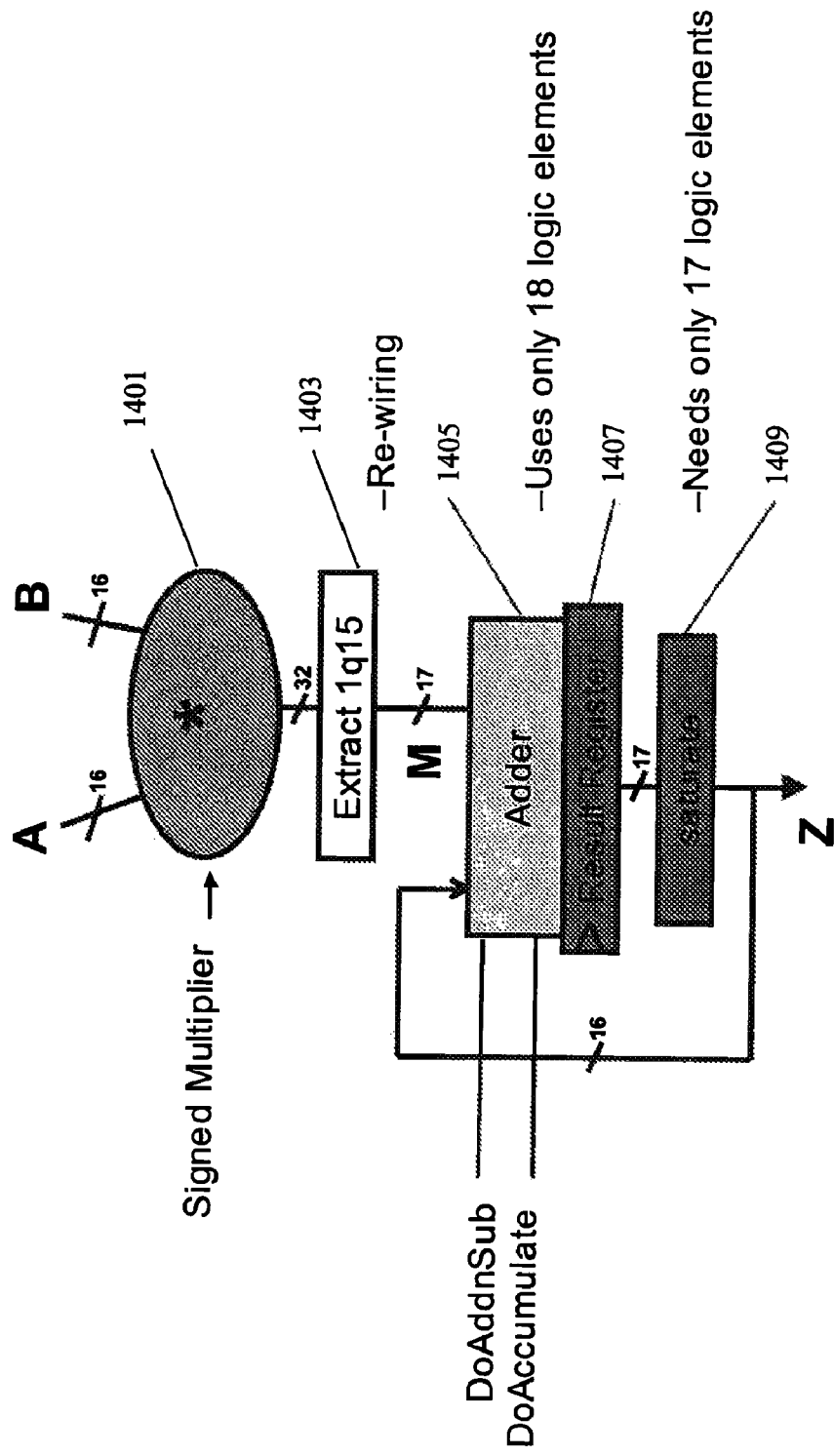
FIG. 14 is a diagrammatic representation showing a multiply accumulate datapath.

FIG. 14 is a diagrammatic representation showing one example of an implementation of multiplication using a reduced number of logic elements. In one example, only 35 logic elements are used. According to various embodiments, a signed multiplication is performed at 1401 on 16 bit values A and B. The resulting 32 bit value is truncated at extractor 1403 and the 1q15 format is provided to an adder 1405. In a first iteration where no accumulation is needed, M is added to no value at 1405 and the result is placed in the result register at 1407. The value is then saturated at 1409 and provided as value Z. In a subsequent iteration, the value Z is provided as another operand to adder 1405. The value Z provided during a previous iteration is added to a value M at 1405 and the result is placed in a result register 1407. The result is then saturated at 1409. According to various embodiments, the adder uses only 18 logic elements while the saturate block 1409 uses only 17 logic elements.

Although the techniques and mechanisms of the present invention are applicable to a variety of different devices including general purpose processors, video accelerators, cryptography accelerators, digital signal processors, microcontrollers, etc., the techniques and mechanisms of the present invention are particularly applicable to programmable chips. Implementing mechanisms such as MAC blocks for performing multiply accumulate operations is typically expensive on a programmable chip.

Figure 15:
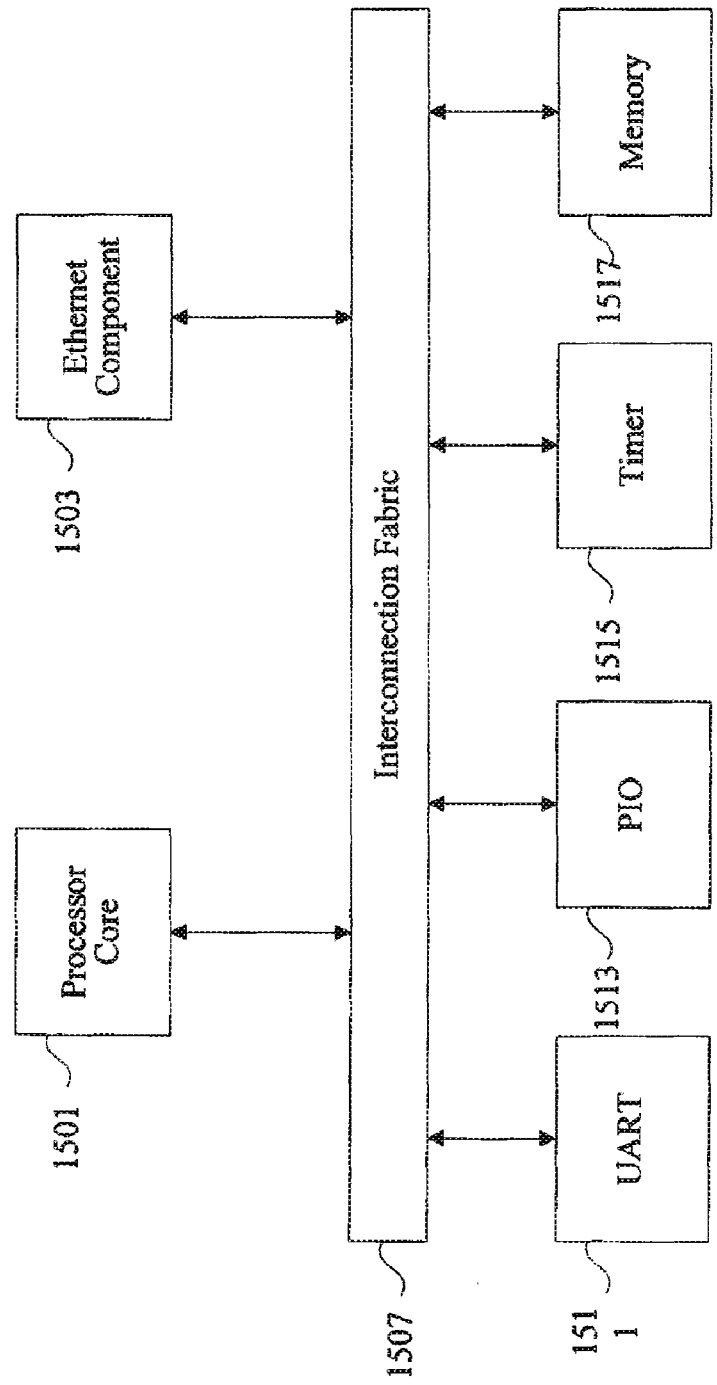
FIG. 15 is a diagrammatic representation showing a programmable chip system.

FIG. 15 is a diagrammatic representation showing one example of a system on a programmable chip that can be used to implement the techniques of the present invention. The system includes a processor core, a hardware accelerator, peripheral devices, and peripheral interfaces. Peripheral devices and peripheral interfaces are herein referred to as components. The system on a programmable chip includes processor core 1501 and an Ethernet component 1503 as well as peripheral components UART 1511, PIO 1513, timer 1515, and data memory 1517. In some examples, the Ethernet component 103 is instead a Digital Signal Processing (DSP) core, a cryptography accelerator, or a video processor. It should be noted that the system can include both on-chip memory 1517 and off-chip memory. In one example, the data memory 1517 can support variable latency or fixed latency access. The components are interconnected using an interconnection fabric 1507. Any mechanism or logic for connecting components in a system is referred to herein as an interconnection fabric. In one example, the interconnection fabric is a bus. In another example, the interconnection fabric is a secondary side arbitration fabric.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of lookup tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register. In other examples, a logic element is an adaptive logic module (ALM) that provides 8 inputs, allowing it to efficiently support various configurations such as 6-input or 7-input lookup tables or two independent 4-input lookup tables.

The techniques and mechanisms of the present invention allow the implementation of a system on a programmable chip from a high-level language program. In one example, variable latency and fixed latency can be supported on a system using a conventional bus architecture.

A system bus typically has a set width (e.g. 64 bits, 128 bits) and allows only one primary component to actively use the bus at any one time. In conventional systems, only one primary component can access any one of the given secondary components at any given time. Multiple primary components accessing secondary components in a manner that would cause data bit collisions if performed on the same data lines is referred to herein as accessing secondary components at the same time.

In one example, an Ethernet component is accessing a secondary PIO. While the Ethernet component is accessing the secondary PIO, a processor can not access an SDRAM through a peripheral interface even if both the primary streaming output device and the peripheral interface are available.

According to various embodiments of the present invention, it is recognized that a bus is no longer required in certain applications such as system on a chip, system on a programmable chip, and other computer system implementations. A device such as a programmable logic device (PLD) or a field programmable gate array (FPGA) using a hardware descriptor language (HDL) is herein referred to as a programmable chip or a programmable device. Instead of implementing complicated bus sharing schemes using mechanisms such as splitting, the bus itself can be eliminated to improve system performance.

According to specific embodiments, it is recognized that primary components and secondary components need not be routed through a construct such as a bus. By not routing signals through a bus, a streaming output device can be implemented in a much more efficient manner. The conventional data and address lines that make up the bus are no longer the resource in contention. Instead, secondary components are resources in contention, as the number of physical lines connected to each secondary component in a system can be fixed. Furthermore, by not using a bus, interconnection flexibility is enhanced. For example, an Ethernet component can be allocated a variety of ports for directly accessing a memory and the only resource in contention would be the memory.

Consequently, a system bus arbitrator associated with all the secondary components in a computer system is no longer needed. Instead, secondary components themselves that may be accessed by more than one primary component are assigned individual secondary side arbitrators. An arbitrator that corresponds to a specific secondary component accessible by more than one primary component is referred to herein as a secondary side arbitrator. In one embodiment, there is a secondary side arbitrator for each secondary component in a computer system. In other embodiments, there is a secondary side arbitrator for selected secondary components in a system. The techniques of the present invention recognize that Ethernet component support for high-level language programs can be more efficiently and effectively provided in a system by using secondary side arbitration.

Figure 16:
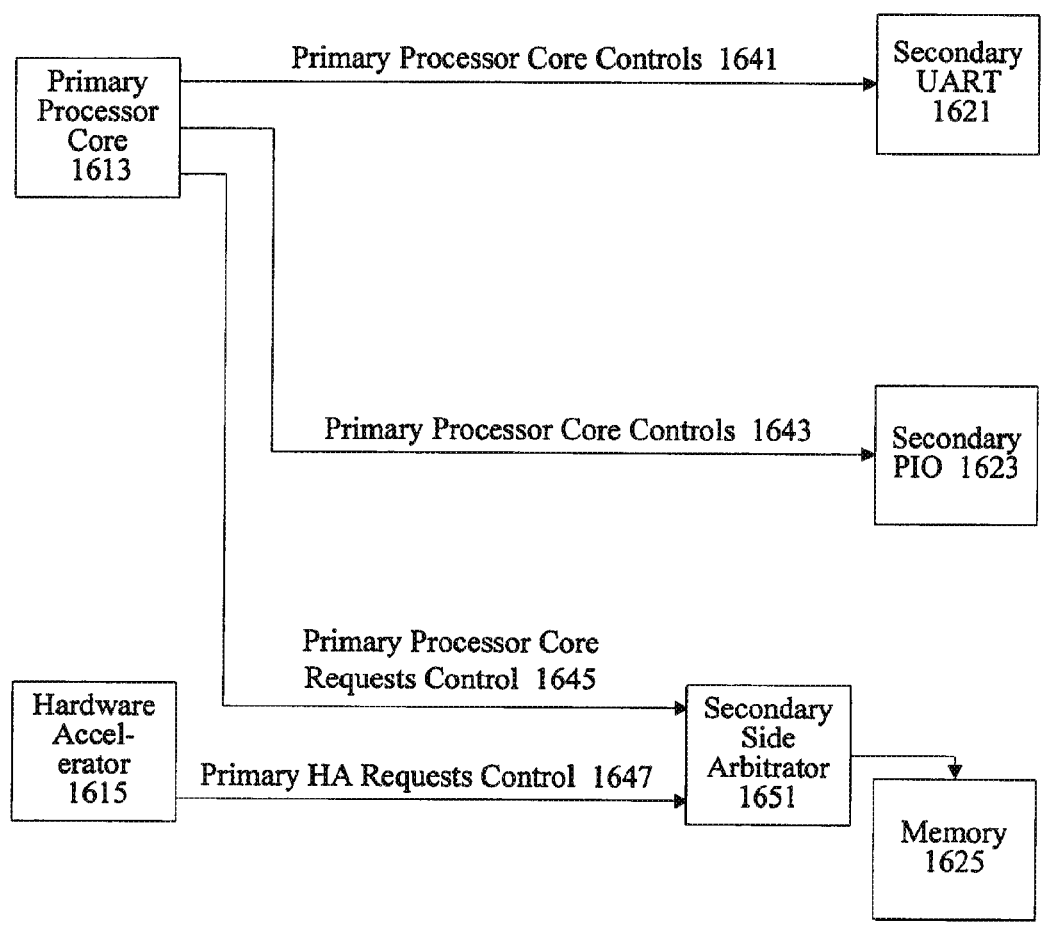
FIG. 16 is a diagrammatic representation showing an interconnection fabric.

FIG. 16 is a diagrammatic representation showing one example of a system using secondary side arbitration, sometimes referred to as slave side arbitration, simultaneous multiple primary components, or simultaneous multiple masters. A system using individual arbitrators that correspond to individual secondary components accessible by more than one primary component is referred to herein as a secondary side arbitration system. The secondary side arbitration system no longer requires a bus or a system bus arbitrator that prevents a second primary component from accessing a second secondary component when a first primary component is accessing a first secondary component. According to various embodiments, a secondary component such as peripheral interface 1625 is associated with a secondary side arbitrator 1651. However, secondary components UART 1621 and PIO 1623 are not associated with any arbitrator. In one example, secondary component UART 1621 and secondary PIO 1623 can only be accessed by primary CPU 1613 and not by primary Ethernet device 1615. A secondary memory component 1625, however, can be accessed by both primary CPU 1613 and primary Ethernet device 1615.

According to various embodiments, a secondary side arbitrator 1651 allows a first secondary component in a system to be accessed by a first primary component at the same time a second secondary component in the system is accessed by a second primary component. For example, peripheral interface 1625 can be accessed by primary Ethernet 1615 through secondary side arbitrator 1651 at the same time, secondary UART 1621 is accessed by primary CPU 1613.

By allowing a CPU to access a secondary component at the same time another primary component such as a streaming output device or an Ethernet component is accessing memory, bus bottlenecks can be reduced. By using the simultaneous multiple primary component architecture, more direct connections between components can also be supported.

Figure 17:
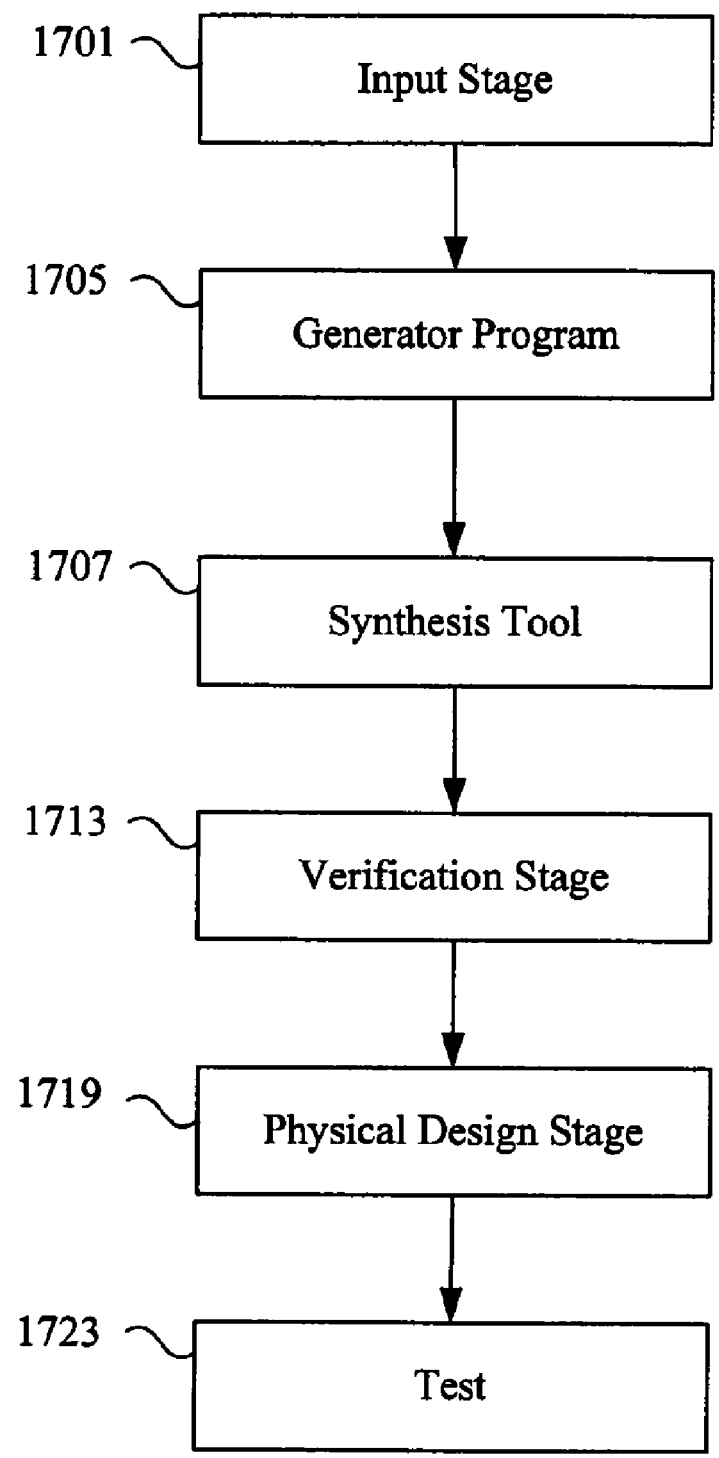
FIG. 17 is a diagrammatic representation showing a technique for implementing the programmable chip.

FIG. 17 is a diagrammatic representation showing implementation of a system on a programmable chip. An input stage 1701 receives selection information typically from a user for logic such as a processor core as well as other components such as a streaming output device to be implemented on an electronic device. In one example, the input received is in the form of a high-level language program. A generator program 1705 creates a logic description and provides the logic description along with other customized logic to any of a variety of synthesis tools, place and route programs, and logic configuration tools to allow a logic description to be implemented on an electronic device.

In one example, an input stage 1701 often allows selection and parameterization of components to be used on an electronic device. The input stage 1701 also allows configuration of variable or fixed latency support. In some examples, components provided to an input stage include intellectual property functions, megafunctions, and intellectual property cores. The input stage 1701 may be a graphical user interface using wizards for allowing efficient or convenient entry of information. The input stage may also be a text interface or a program reading a data file such as a spreadsheet, database table, or schematic to acquire selection information. The input stage 1701 produces an output containing information about the various modules selected.

In typical implementations, the generator program 1705 can identify the selections and generate a logic description with information for implementing the various modules. The generator program 1705 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 1705 identifies pointers and provides ports for each pointer. One tool with generator program capabilities is System on a Programmable Chip (SOPC) Builder available from Altera Corporation of San Jose, Calif. The generator program 1705 also provides information to a synthesis tool 1707 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 1709.

As will be appreciated by one of skill in the art, the input stage 1701, generator program 1705, and synthesis tool 1707 can be separate programs. The interface between the separate programs can be a database file, a log, or simply messages transmitted between the programs. For example, instead of writing a file to storage, the input stage 1701 can send messages directly to the generator program 1705 to allow the generator program to create a logic description. Similarly, the generator program can provide information directly to the synthesis tool instead of writing HDL files. Similarly, input stage 1701, generator program 1705, and synthesis tool 1707 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 1707.

A synthesis tool 1707 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 1713 typically follows the synthesis stage 1707. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 1713, the synthesized netlist file can be provided to physical design tools 1719 including place and route and configuration tools. A place and route tool typically locates logic cells on specific logic elements of a target hardware device and connects wires between the inputs and outputs of the various logic elements in accordance with logic required to implement an electronic design. The device can also be physically tested at 1723.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 1701, the generator program 1705, the synthesis tool 1707, the verification tools 1713, and physical design tools 1719 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 18:
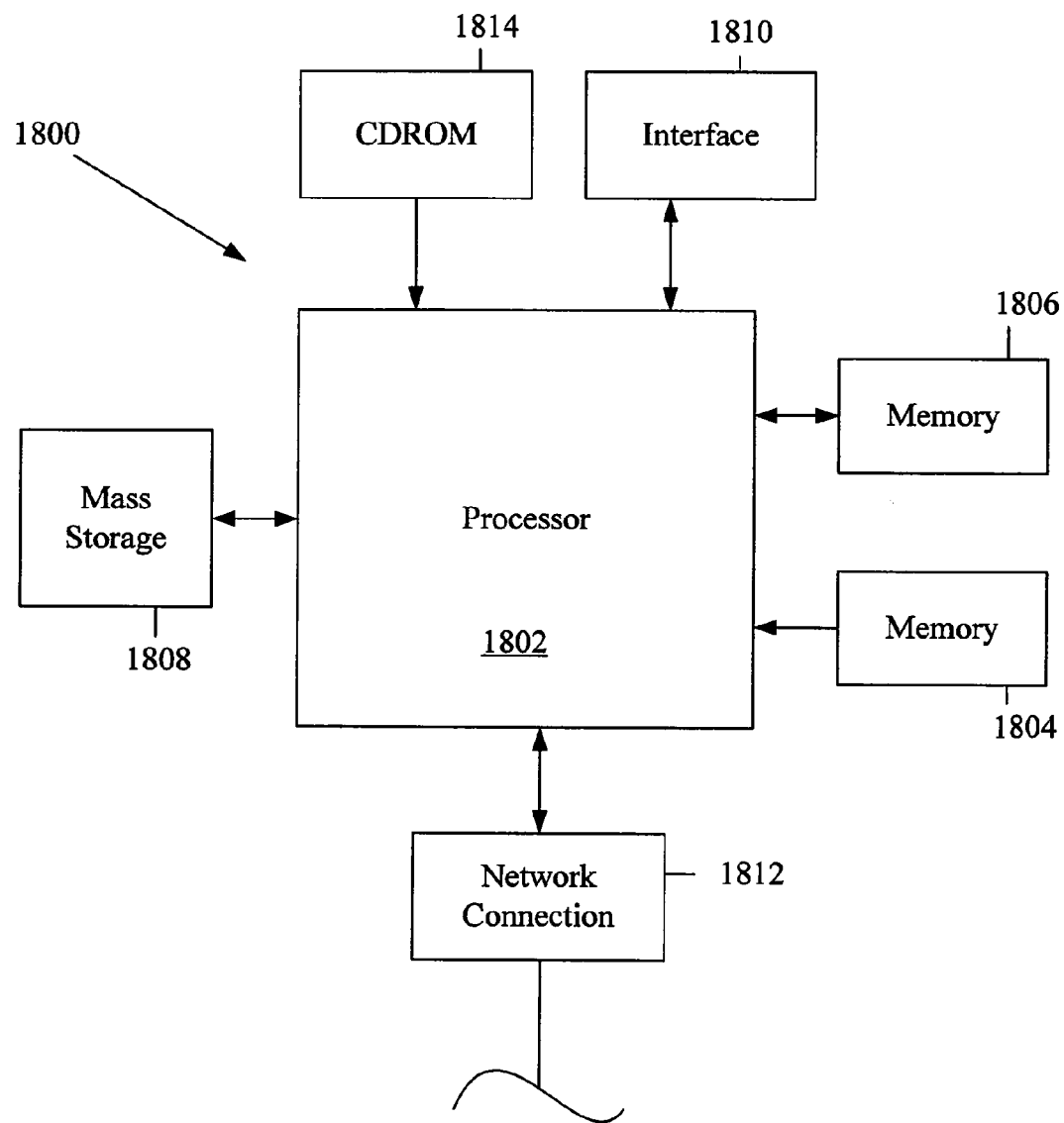
FIG. 18 is a diagrammatic representation depicting a computer system.

FIG. 18 illustrates a typical computer system that can be used to implement a programmable chip. The computer system 1800 includes any number of processors 1802 (also referred to as central processing units, or CPUs) that are coupled to devices including memory 1806 (typically a random access memory, or "RAM"), memory 1804 (typically a read only memory, or "ROM"). The processors 1802 can be configured to generate a test sequences for any designated processor. As is well known in the art, memory 1804 acts to transfer data and instructions uni-directionally to the CPU and memory 1806 is used typically to transfer data and instructions in a bi-directional manner.

Both of these memory devices may include any suitable type of the computer-readable media described above. A mass storage device 1808 is also coupled bi-directionally to CPU 1802 and provides additional data storage capacity and may include any of the computer-readable media described above. The mass storage device 1808 may be used to store programs, data and the like and is typically a secondary storage medium such as a hard disk that is slower than memory. The mass storage device 1808 can be used to hold a library or database of prepackaged logic or intellectual property functions, as well as information on generating particular configurations. It will be appreciated that the information retained within the mass storage device 1808, may, in appropriate cases, be incorporated in standard fashion as part of memory 1806 as virtual memory. A specific mass storage device such as a CD-ROM 1814 may also pass data uni-directionally to the CPU.

CPU 1802 is also coupled to an interface 1810 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1802 optionally may be coupled to a computer or telecommunications network using a network connection as shown generally at 1812. With such a network connection, it is contemplated that the CPU might receive information from the network, or might output information to the network in the course of performing the above-described method steps. It should be noted that the system 1800 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 1808 or 1814 and executed on CPU 1808 in conjunction with primary memory 1806.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of processors and instruction lengths and should not be restricted to the ones mentioned above. It is therefore intended that the invention be interpreted to include all variations and equivalents that fall within the true spirit and scope of the present invention.

What is claimed is:

1. A method comprising:
   receiving a first value A and a second value B at a multiplier;
   saturating an output of the multiplier by using saturating addition/subtraction logic before accumulating by using the saturating addition/subtraction logic; and
   storing the output of the multiplier in unsaturated form.

2. The method of claim 1, wherein the output of the multiplier is stored in unsaturated form in a result register.

3. The method of claim 2 further comprising:
   saturating an output of the result register and providing the output of the result register to the addition/subtraction logic.

4. The method of claim 1, wherein the first value A and the second value B are 16 bit values.

5. The method of claim 1, wherein the first value A and the second value B are 16-bit values provided in 1q15 format.

6. The method of claim 1, wherein the multiplier provides the output of the multiplier to an extractor.

7. The method of claim 1, wherein the output of the multiplier is a 32-bit product.

8. The method of claim 7, wherein the extractor formats the output of the multiplier into 1q15 format.

9. The method of claim 1, wherein the output of the multiplier is provided as a first operand to the addition/subtraction logic.

10. The method of claim 9, wherein the output of the result register is saturated to generate a saturated output value.

11. The method of claim 10, wherein the saturated output value is provided as a second operand to the addition/subtraction logic.

12. A device comprising:
    a multiplier operable to receive a first input value on a first input line and a second input value on a second input line to generate an output value;
    addition/subtraction logic operable to use the output value as a first input and generate an output value; and
    a saturation block operable to saturate the output value of the addition/subtraction logic to generate a saturated output value, wherein the saturated output value is fed back to the addition/subtraction logic on the second input line.

13. The device of claim 12, wherein multiplier is hard-coded and the addition/subtraction logic is implemented using programmable logic.

14. The device of claim 12, wherein the multiplier is a saturating multiplier.

15. The device of claim 12, wherein the first input value and the second input value are 16 bit values.

16. The device of claim 14, wherein the first input value and the second input value are 16-bit values provided in 1q15 format.

17. The device of claim 12, wherein an extractor formats the output value from a 32-bit product into a 1q15 value.

18. The device of claim 12, wherein the device is a programmable chip.

19. The device of claim 12, wherein the output value is maintained in a result register in unsaturated format.

20. A system comprising:
    a device having:
      a multiplier;
      addition/subtraction logic; and
      a saturation block,
      wherein the multiplier is operable to receive a first input and a second input, and wherein the multiplier is operable to generate an output,
      wherein the addition/subtraction logic is operable to use the output of the multiplier as a first input and to generate provide an output value, and wherein the saturation block is operable to saturate the output value from the addition/subtraction logic to provide a value Z as a second input to the addition/subtraction logic.

* * * * *

UNITED STATES PATENT AND TRADEMARK OFFICE
CERTIFICATE OF CORRECTION

PATENT NO.        : 8,214,419 B2                                        Page 1 of 1
APPLICATION NO.   : 12/346692
DATED             : July 3, 2012
INVENTOR(S)       : Paul Metzgen It is certified that error appears in the above-identified patent and that said Letters Patent is hereby corrected as shown below:

In column 12, line 28, in Claim 13, insert -- the -- between "wherein" and "multiplier".

Signed and Sealed this
Twenty-eighth Day of August, 2012

David J. Kappos
*Director of the United States Patent and Trademark Office*